United States Patent [19]

Harding

[11] 4,339,484
[45] Jul. 13, 1982

[54] SOLAR COLLECTOR

[75] Inventor: Geoffrey L. Harding, Sydney, Australia

[73] Assignee: University of Sydney, Sydney, Australia

[21] Appl. No.: 126,918

[22] Filed: Mar. 3, 1980

Related U.S. Application Data

[63] Continuation-in-part of Ser. No. 797,661, May 17, 1977, abandoned.

[51] Int. Cl.³ .............................................. F24J 3/02
[52] U.S. Cl. ................................. 428/36; 126/417; 126/438; 126/442; 126/443; 428/432; 428/433; 428/450; 428/469; 428/471; 428/913; 126/271.1; 126/271.2 R; 428/539.5
[58] Field of Search .............. 126/443, 442, 438, 270, 126/271, 417; 428/36, 432, 433, 450, 469, 471, 539, 913, 35

[56] References Cited

U.S. PATENT DOCUMENTS

| | | | |
|---|---|---|---|
| 2,917,817 | 12/1959 | Tabor | 428/469 |
| 3,189,477 | 6/1965 | Shaffer | 428/472 |
| 3,215,134 | 11/1965 | Thomason | 126/271 |
| 3,306,764 | 2/1967 | Lewis | 428/450 |
| 3,383,235 | 5/1968 | Blackburn | 428/450 |
| 3,540,920 | 11/1970 | Wakefield | 428/450 |
| 3,922,405 | 11/1975 | Komatsu | 428/469 |
| 3,952,724 | 4/1976 | Pei | 126/271 |
| 4,011,190 | 3/1977 | Telkes | 126/270 |
| 4,022,947 | 5/1977 | Grubb | 428/469 |
| 4,043,318 | 8/1977 | Pei | 126/271 |
| 4,098,956 | 7/1978 | Blickenderfer | 428/627 |

OTHER PUBLICATIONS

Harding, McKenzie, Window; "The dc Sputter Coating of Solar-Selective Surfaces Onto tubes;" J. Vac. Sci. Technol., vol. 13, No. 5, pp. 1073–1075, Sep./Oct. 1976.
Harding, "Sputtered Metal Carbide Solar-Selective Absorbing Surfaces;" J. Vac. Sci. Technol., vol. 13, No. 5, pp. 1070–1072, Sep./Oct. 1976.

Primary Examiner—Marion McCamish
Attorney, Agent, or Firm—Ladas & Parry

[57] ABSTRACT

A solar energy collector element which comprises a glass tube which is coated on its exterior surface with a solar selective coating, the coating comprising a metal substrate which has a relatively low infra-red emittance and a composite metal film. The composite metal film comprises a metal-carbide which is deposited on the substrate by a reactive sputtering process.

11 Claims, 3 Drawing Figures

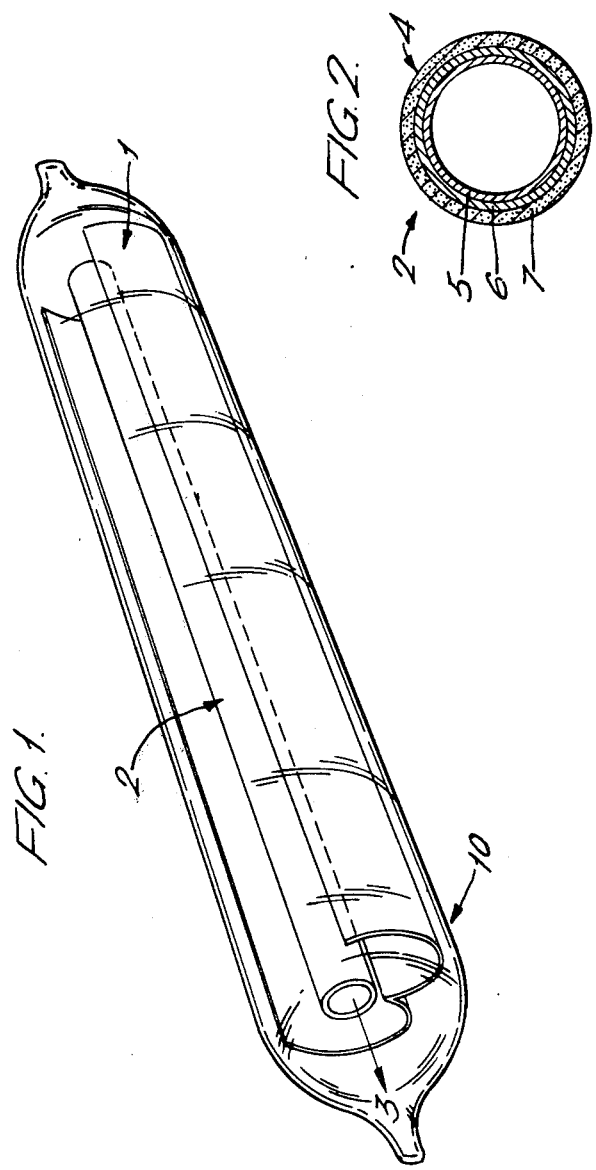

SOLAR COLLECTOR

CROSS REFERENCE TO RELATED CASE

This is a continuation-in-part of U.S. Patent Application Ser. No. 797,661, filed May 17, 1977 by Geoffrey Lester Harding, entitled Solar Collector, and now abandoned.

FIELD OF THE INVENTION

The invention relates to a solar energy collector and, more particularly, to a solar selective coating for a tubular glass collector element.

BACKGROUND OF THE INVENTION

Solar energy collectors which currently are available rely on the absorption principle and they are provided with a matt black surface coating which serves to absorb incident energy and to transfer such energy to a fluid medium which is passed through the collectors. Simple such absorbing surfaces are characterised by poor efficiency (low absorptivity and high emissivity) and attempts have been made to increase heat collection efficiency by use of so-called solar selective surface coatings. Such coatings provide for high absorption of incident solar radiation and low emittance of infra-red radiation.

U.S. Pat. No. 2,917,817 discloses a solar collector or, more specifically, a so-called receiver which employs what might be regarded as a rudimentary solar selective surface coating. The coating is achieved by electrolytically depositing a dark metal surface layer onto a bright metal base or by oxidising the outer surface of the bright metal base so as to obtain a surface layer which is both light absorbing and transparent to heat radiation. The bright metal base is constituted by the receiver itself, the receiver being employed to transfer collected heat to water or another heat exchange medium, and hence the referenced patent does not teach the application of a two-layer coating to a carrier for a fluid medium.

U.S. Pat. No. 3,952,724 does teach a solar energy collector arrangement in which glass tubes are employed as carriers for heat exchange fluid, typically water, and such tubes are provided with an energy absorbing coating which is specified to have a high absorptivity and low emissivity. However, this patent also does not specify a two-layer coating, the exemplified coating materials being black chrome, nickel, lampblack, carbon or copper. The selected coating material is compounded for application to the tube surface, such as by painting.

Of further interest in the context of the present invention is a report made in publication RI8167 of the Bureau of Mines Reports of Investigations, 1976, entitled "Reflectance and Emittance of Spectrally Selective Titanium and Zirconium Nitrides". Such report considers the applicability of titanium and zirconium nitride films as solar selective coatings for solar collectors. However titanium and zirconium metals are expensive and for this and other reasons pertaining to the deposition of nitride films, solar collectors employing such film materials do not lend themselves to commercially viable production.

Other solar selective surface coatings which have been proposed are metal-oxides, but such coatings are not very stable at high temperatures in vacuum, such conditions being the normal conditions to which the coatings are exposed in practice.

OBJECT OF THE INVENTION

It is an object of the present invention to provide a solar selective surface coating for a glass tube, which facilitates the production of solar collector elements at an acceptable cost level, which is stable under normal operating conditions and which, when applied to the tube, provides a high absorptance of solar radiation and a low infra-red emittance.

The expression "high absorptance of solar radiation" is to be understood in the context of this specification to mean an absorptance of at least 0.75. Also, by the expression "low infra-red emittance" is meant an emittance not greater than 0.10.

SUMMARY OF THE INVENTION

The present invention flows from a discovery made by the inventor that metal-carbides possess optical properties which render such material suitable for use in solar selective coatings.

Thus, the invention provides a solar energy collector element which comprises a glass tube which is coated on its exterior surface with a substrate and a composite metal film. The substrate has a thickness of at least $0.05 \times 10^{-6}$ m. and is composed of a metal having a low infra-red emittance. The composite metal film comprises a metal-carbide which has a thickness within the range $0.04 \times 10^{-6}$ m. to $0.20 \times 10^{-6}$ m. and the composite metal film is deposited on the substrate by a reactive sputtering process.

PREFERRED FEATURES OF THE INVENTION

The substrate preferably comprises copper and the substrate is preferably deposited on the glass tube by a sputtering process from a copper electrode. Another metal, for example an alloy of iron, nickel and chromium, may be deposited on the glass tube (also by a sputtering process) before depositing the copper in order to aid adhesion between the copper and the glass tube.

The metal component of the metal-carbide film may comprise iron but it preferably comprises a mixture of iron, chromium and nickel atoms. Such mixture may be obtained by use of a stainless steel sputter electrode in the reactive sputtering process.

The carbon component of the metal-carbide film is preferably obtained by employing methane or other hydrocarbon gas as an impurity in an inert gas (e.g. argon) in the reactive sputtering process.

Preferably, the composite metal film when deposited has an electrical resistance which is less than 100 k $\Omega$ per square. Deposition of the metal-carbide to meet the desired electrical resistance measurement is effected by appropriately proportioning the concentration of metal and carbon atoms in the coating. Thus, by reactively sputtering a metal with a low methane gas concentration a coating is produced which is metal-rich and hence which has a low resistance. Conversely, a high methane concentration produces a dielectric film which has a high electrical resistance. The metal-carbide coating may be "graded", that is by increasing the carbon proportion of the coating relative to the metal proportion with increasing thickness of the coating. If the metal-carbide coating is not graded the relative concentration of the metal and carbon atoms should be adjusted (during the reactive sputtering process) to provide an electrical resistance in the order of 10 k Ω to 100 k Ω per square. However, when grading is employed the electrical resistance will be substantially lower than 100 k Ω per square.

The solar slective surface coating which is proposed by the present invention permits the use of inexpensive metals, such as iron or stainless steel, and the coating is stable under high temperature conditions in vacuum. These factors render the coating practically and economically attractive. Additionally, the surface coating provides a high absorptance of solar radiation and for low emission of thermal radiation. The components of the coating can be applied conveniently by a reactive sputtering process and the thickness of both the substrate material and the composite metal film can be controlled by controlling the sputtering period. The sputtering and reactive sputtering processes may be effected using the method and apparatus as disclosed in a paper which was prepared by the inventor jointly with Doctors D. R. McKenzie and B. Window and which has been published in the Journal of Vacuum Science Technology (published by the American Vacuum Scoiety) No. 5, September/October 1976, page 1073 et seq, entitled "The dc sputter coating of solar-selective surfaces onto tubes". Reference may also be made to page 1070 et seq in the same publication for a paper which was prepared by the inventor alone, which is entitled "Sputtered metal carbide solar-selective absorbing surface" and which discloses material pertinent to the present invention. These two papers are hereby inserted into this specification by reference.

The invention will be more fully understood from the following description of preferred features and examples of the invention, the description being given with reference to the accompanying drawings.

BRIEF DESCRIPTION OF THE DRAWINGS

FIG. 1 shows a solar energy collector element,

FIG. 2 shows a cross-section through an energy collecting tube which forms a portion of the collector element.

DETAILED DESCRIPTION OF THE INVENTION

Figure 3:
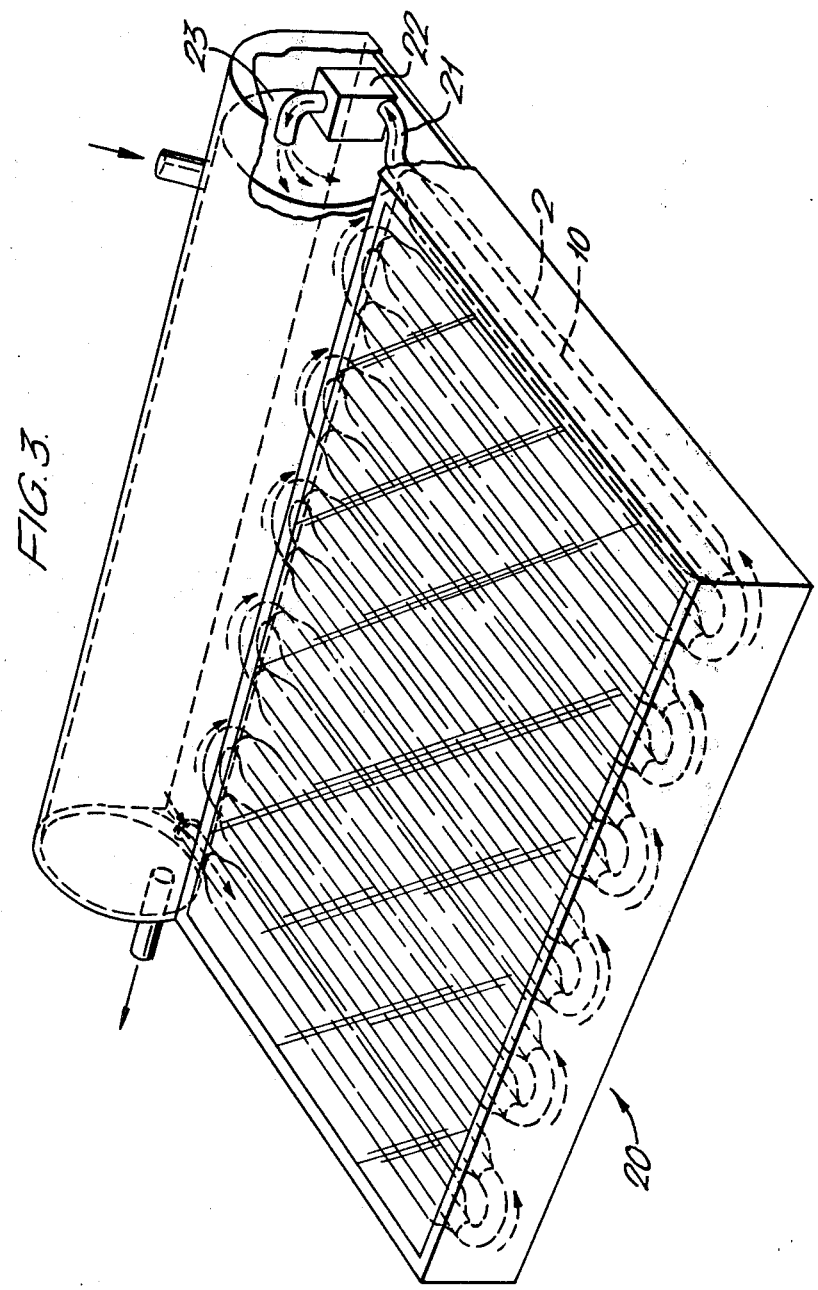
FIG. 3 shows a solar heating panel which embodies a number of the collector elements of the type shown in FIG. 1.

FIG. 1 shows a solar energy collector element which comprises a cusp reflector 1 which locates about one side of an energy collecting tube 2 through which a fluid medium is continuously passed in the direction of arrow 3 to extract heat which is conducted through the wall of the tube and which provides the working medium. In practice, a bank of such collector elements would be arranged side-by-side and the working fluid would be passed through them either serially or in parallel streams. The aperture of the cusp reflector is orientated toward the sun when the collector elements are located in situ. A glass envelope 10 surrounds the reflector 1 and the tube 2, and the space between the tube 2 and the envelope 10 is evacuated.

FIG. 2 shows a cross sectional elevation of the tube 2 of FIG. 1, and FIG. 2 is diagrammatic in the sense that the relative thicknesses of elements of the tube are not drawn to scale.

The tube 2 comprises a glass cylinder 5 through which the working fluid is passed and a coating 4. The coating 4 comprises an inner copper substrate 6 which is sputtered onto the cylinder 5 and a metal-carbide film 7 which is deposited onto the copper substrate 6 by a reactive sputtering process.

The copper substrate 6 is deposited on the glass cylinder 5 by sputtering in an inert gas such as argon and it is deposited to a thickness of at least $0.05 \times 10^{-6}$ m. and preferably to a thickness of $0.20 \times 10^{-6}$ m.

The metal-carbide, typically iron-carbide is deposited on the copper substrate to a thickness falling within the range $0.04 \times 10^{-6}$ m. to $0.20 \times 10^{-6}$ m. The thickness of the metal-carbide is preferably chosen so that a graph of reflectance against wave length exhibits a minimum (with normal or near normal incidence of light) at wave lengths between $0.80 \times 10^{-6}$ m. and $1.00 \times 10^{-6}$ m. This corresponds with a metal-carbide thickness of about $0.09 \times 10^{-6}$ m.

The required thickness of the substrate 6 and the metal-carbide film 7 is achieved by control applied during sputtering, and the composition of the metal-carbide is determined by operating conditions which exist in the reactive sputtering process. The sputtering process which is described in the aforementioned paper by Drs. Harding, McKenzie and Window may be employed for deposition of the substrate and metal-carbide coatings.

The following is an example of the operating conditions and parameters which are applicable to deposition of the copper substrate onto a plane surface element:

| Sputter electrode material | Copper |
|---|---|
| Electrode area | $7.5 \times 10^{-3}$ m.$^2$ |
| Electrode potential | $-1200$ v. |
| Element - electrode spacing | 17 mm. |
| Element potential | 0V |
| Sputter supporting gas | 100% Argon |
| Gas flow rate | As fast as possible |
| Gas pressure | 0.20 Torr |
| Sputtering time | 5 minutes |

After deposition of the copper layer, the iron-carbide coating is applied to the element under the following operating parameters and conditions:

| Sputter electrode material | Iron (or stainless steel) |
|---|---|
| Electrode area | $7.5 \times 10^{-3}$ m.$^2$ |
| Electrode potential | $-1200$ V. |
| Electrode - element spacing | 17 mm. |
| Element potential | 0V |
| Reactive/sputter supporting gas | 1.6% (by vol.) Methane in Argon |
| Gas flow rate | 0.25 cm$^3$s$^{-1}$ at 1 Atmosphere |
| Gas pressure | 0.20 Torr |
| Sputtering time | 4 minutes |
| Film Thickness deposited | $0.09 \times 10^{-6}$ m. |

A coating produced under the above conditions has an absorptance of 0.82 and an emittance of 0.03 at room temperature.

For coating the outside surface of long glass tubes, the copper substrate may be deposited onto the tube in an elongate sputtering chamber using a copper electrode which extends for the length of the chamber and parallel to the axis of the tube, with argon being employed as a sputter supporting gas. Similarly, for deposition of the metal-carbide film, reactive sputtering may be effected within the sputtering chamber using a long metal (e.g. stainless steel) electrode which extends parallel to the axis of the tube and which is spaced approximately 10 mm from its surface. During both sputtering and reactive sputtering, the tube is rotated slowly about its axis.

Also, during the reactive sputtering process, an argon and methane gas mixture is caused to flow into the sputtering chamber is such a way that approximately uniform sputtering conditions are maintained along the length of the tube onto which the metal-carbide is deposited. This is achieved by arranging for the gas to flow into the sputtering chamber at right angles to the axis of the tube. To this end, perforated gas delivery and exhaust pipes are disposed in parallel and at opposite sides of the tube onto which the film is deposited, so that the gas is caused to flow toward, around and then away from the tube in a transverse direction. By carrying out the sputtering under these conditions the film deposited on the tube has a uniform thickness along its length.

After deposition of the copper substrate 6 and the metal-carbide film 7, the collector tube 2 is sheathed in the sealed evacuated envelope 10, which is made from baked pyrex or soda glass, together with the reflector 1. The reflector is not an essential element of the collector unit.

The working fluid may comprise oil or another fluid which can be passed into and from the tube 2 by way of a connecting conduit.

A number of the collector elements would normally be mounted side-by-side to form a collector array of a solar heating panel 20 as shown in FIG. 3, the collector array being mounted to receive incident solar radiation and with the tubes 2 connected in series or in parallel in a closed circuit which incorporates a pump 22 and a heat exchanger or reservoir 23.

I claim:

1. A solar energy collector element comprising a first glass tube into which a fluid to be heated can be directed, a second glass tube which has an internal diameter which is greater than the external diameter of the first tube and which is located about the first tube, an end-sealed evacuated space defined by the external and internal surfaces respectively of the first and second tubes, and a solar selective surface coating on the external surface of the first tube; the solar selective surface coating comprising a substrate and a composite metal film, the substrate having a thickness of at least $0.05 \times 10^{-6}$ m. and being composed of a metal which has a relatively low infra-red emittance, and the composite metal film comprising a metal-carbide which has a thickness between $0.04 \times 10^{-6}$ m. and $0.20 \times 10^{-6}$ m. and which is deposited on the substrate by a reactive sputtering process.

2. A solar energy collector element as claimed in claim 1 wherein the metal carbide film has an electrical resistance which is not greater than 100 k $\Omega$ per square.

3. A solar energy collector element as claimed in claim 1 wherein the composite metal film comprises atoms of iron, chromium, nickel and carbon which are deposited to form a film thickness of about $0.10 \times 10^{-6}$ m.

4. A solar energy collector element as claimed in claim 1 wherein the substrate comprises copper which is deposited on the surface of the first tube by a sputtering process.

5. A solar energy collector element comprising a first glass tube into which a fluid to be heated can be directed, a second glass tube which has an internal diameter which is greater than the external diameter of the first tube and which is located about the first tube, and end-sealed evacuated space defined by the external and internal surfaces respectively of the first and second tubes, and a solar selective surface coating on the external surface of the first tube; the solar selective surface coating comprising a substrate and a composite metal film, the substrate having a thickness of at least $0.05 \times 10^{-6}$ m. and being composed of a metal which has a relatively low infra-red emittance, and the composite metal film comprising a metal-carbide which has a thickness of at least $0.04 \times 10^{-6}$ m. and which is deposited on the substrate by a reactive sputtering process.

6. A solar energy collector element as claimed in claim 5, wherein the metal-carbide film has a thickness of about $0.09 \times 10^{-6}$ m.

7. A method of making a solar energy collector element and which comprises the steps of:
depositing onto the external surface of a first glass tube to a thickness of not less than $0.05 \times 10^{-6}$ m. a substrate composed of a metal having a relatively low infra-red emittance,
depositing onto the substrate by a reactive sputtering process a metal-carbide film, the metal-carbide film being deposited to a thickness falling within the range $0.04 \times 10^{-6}$ m. to $0.20 \times 10^{-6}$ m,
locating about the first tube a second glass tube which has an internal diameter greater than the external diameter of the first tube,
interconnecting the first and second tubes whereby a space is defined therebetween, and
evacuating the space between the first and second tubes.

8. A method as claimed in claim 7 wherein the composite metal film is deposited as a mixture of iron, chromium, nickel and carbon atoms to a total thickness of about $0.10 \times 10^{-6}$ m.

9. A method as claimed in claim 7 wherein the substrate is deposited in the form of copper by a sputtering process.

10. A method of making a solar energy collector element and which comprises the steps of:
depositing onto the external surface of a first glass tube to a thickness of not less than $0.05 \times 10^{31\ 6}$ m. a substrate composed of a metal having a relatively low infra-red emittance,
depositing onto the substrate by a reactive sputtering process a metal-carbide film, the metal-carbide film being deposited to a thickness of at least $0.04 \times 10^{-6}$ m,
locating about the first tube a second glass tube which has an internal diameter greater than the external diameter of the first tube,
interconnecting the first and second tubes whereby a space is defined therebetween, and
evacuating the space between the first and second tubes.

11. A method as claimed in claim 10, wherein the metal-carbide film is deposited to a thickness of about $0.09 \times 10^{-6}$ m.

* * * * *